Feb. 26, 1963  R. L. FILLMORE ET AL  3,079,540
LINEAR POSITIONING SERVOSYSTEMS
Filed Dec. 23, 1959  4 Sheets-Sheet 1

INVENTORS
ROBERT L. FILLMORE
ROYAL R. HAWKINS
Joseph E. Ryan
ATTORNEY

United States Patent Office 3,079,540
Patented Feb. 26, 1963

3,079,540
LINEAR POSITIONING SERVOSYSTEMS
Robert L. Fillmore, Mound, and Royal R. Hawkins, Bloomington, Minn., assignors to Minneapolis-Honeywell Regulator Company, Minneapolis, Minn., a corporation of Delaware
Filed Dec. 23, 1959, Ser. No. 861,579
9 Claims. (Cl. 318—30)

Our invention relates to linear positioning systems and more particularly to an improved digital to analogue conversion circuit used in conjunction with a position feedback transducer having polyphase characteristics. A need for improved performance and increased accuracy in positioning systems both linear and rotary has become evident with recent improvements in the field of automation and in particular in the application of automatic controls to machine tools. Extreme accuracy over wide ranges of movement has not been satisfactorily obtained except through expensive, complex, mechanical arrangements or similarly complex and expensive electrical apparatus. With mechanical arrangements speed of response has been a detrimental factor. Electrical circuits have been utilized to improve the linear positioning systems from this aspect and have in some instances used fine and coarse controls for rapidly adjusting to the approximate desired setting and then accurately adjusting the fine control to the ultimate desired point. The present invention is specifically directed to an apparatus of this type which is basically simplified over the previous systems utilized. This invention utilizes a command source which provides variable phase signals in accordance with selected switch positions representing desired degrees or units of movement to provide an ultimate coarse and a fine signal which will operate in the servo system to accurately position and rapidly position a servo and hence the load or unit to be positioned. It is therefore an object of this invention to provide an improved linear positioning system. It is another object of this invention to provide an apparatus of this type using a phase variable network and an associated switching arrangement to provide signals of varying phase for control of the servo system in accordance with a decimal input positioning the switches. A further object of this invention is to provide a linear positioning system which is simple in design and economical to manufacture. Another object of this invention is to provide a linear positioning system in which the phase variable feedback information indicating actual position is derived from synchros which have a three-phase stator excitation with the phase variable on the rotor winding. These and other objects of this invention will become apparent from a reading of the attached description together with the drawings wherein:

Figures 1, 6A, 6B:
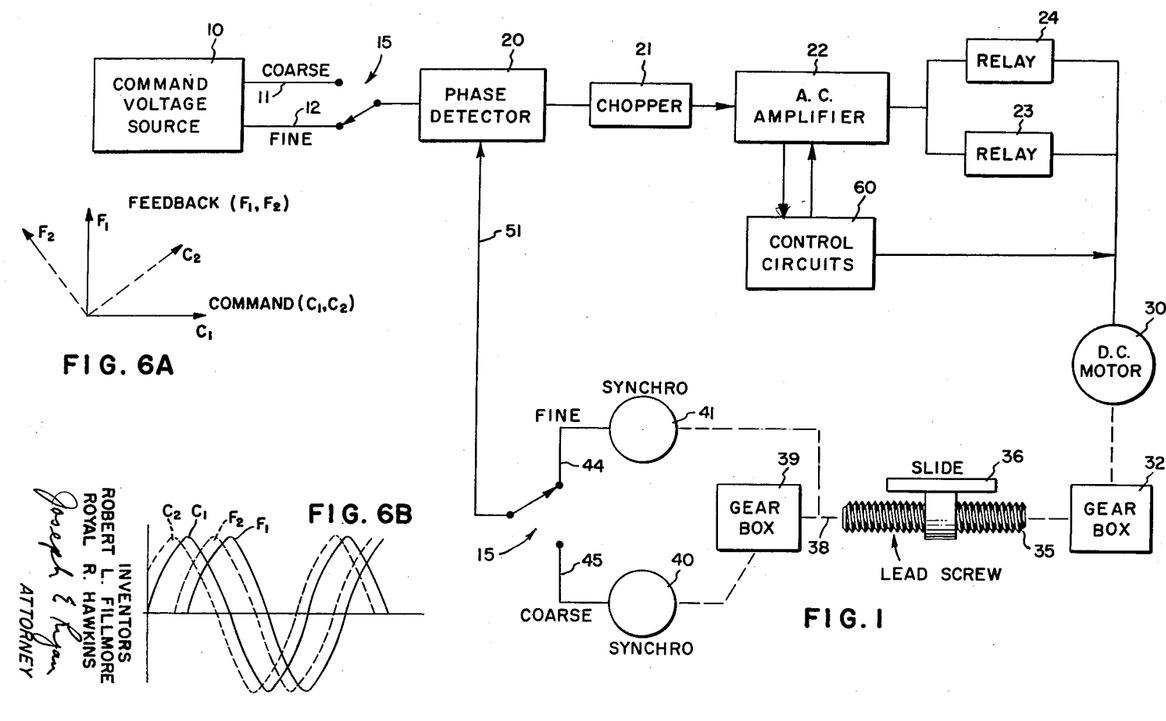
FIGURE 1 is a schematic or diagrammatic view of the entire servo system including the command source, FIGURES 2a and b are schematic circuit drawings of the improved command bridge type network to produce the variable phase signals with FIGURE 2b being the associated switching network to select the variable phase signal outputs from digital or decimal information.
FIGURES 6a and 6b are vector and phase diagrams of the voltage from the bridge network and the feedback portion of the servo system.

Our improved linear positioning system is shown schematically in FIGURE 1 as applied to a direct current type motor together with associated controls to provide a complete servo loop. It will be recognized, however, that other types of motors may be used including electrohydraulic or pneumatic. The command source is shown in block form in FIGURE 1 at 10 having a pair of outputs shown generally as conductors 11 and 12 leading therefrom to indicate two electrical circuits. These electrical connections are fed through a relay or switching member indicated generally at 15 to a phase detecting apparatus 20 shown in block form. The output of the phase detector is connected to a chopper or signal converter 21 and through an A.C. amplifier 22 to a pair of relays 23, 24 which selectively determine the direction of rotation of the D.C. motor indicated at 30. The output of the motor drives through suitable gearing indicated by the block at 32, a drive screw 35 or lead screw having associated therewith a slide 36 threaded on the screw and positioned in accordance with rotation of the lead screw as an indication of the apparatus to be linearly positioned. Also mechanically connected through mechanical connections 38 and gearing 39 are synchros 40 and 41 which are driven from the lead screw and motor and operate to provide an electrical signal feedback in accordance with rotation of motor. The synchro 41 is a fine synchro and is connected directly to the lead screw while the coarse synchro 40 is connected through gearing at a reduction ratio such that one-half revolution or less corresponds to full travel of the slide. An intermediate gear ratio may be used on a third synchro for very long slide travels. The electrical signal outputs from the synchros are connected to electrical connections 44, 45 to a second portion or set of contacts of switch 15 which selectively connects one or the other of the synchros in a feedback circuit indicated generally by the conductor 51 to the phase detector. Thus the phase detector compares the command signal from the command apparatus 10 and the feedback signal from the synchros 40, 41 from a phase standpoint to provide a D.C. error signal whose amplitude is dependent on the phase difference. The error signal is then modulated and used to control the amplifier. As will be later noted in FIGURE 4, a series of control circuits indicated generally by the block at 60 operates on the relays through the amplifier 22 and on the motor 30 to initiate the switching operation for the pair of switches 15 and in addition include the circuitry involved for the relays 23, 24.

Figure 2A:
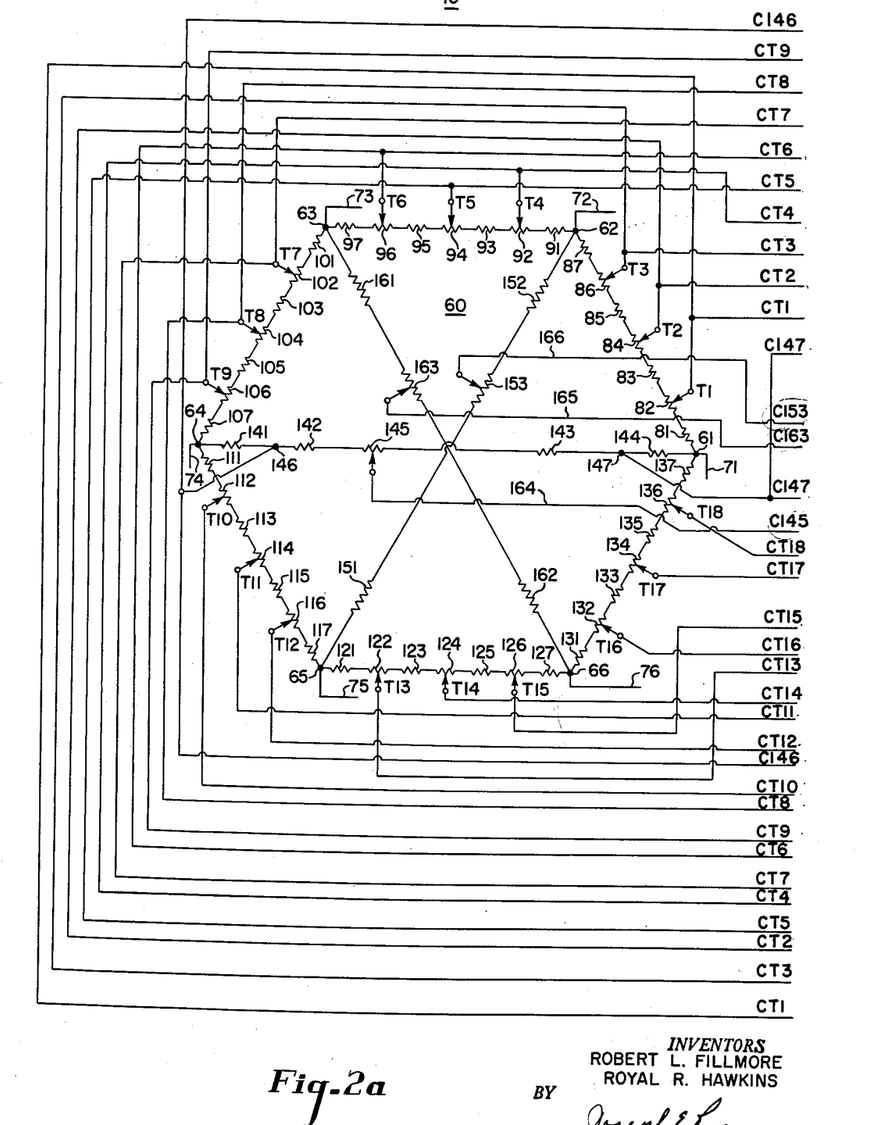
Figure 2B:
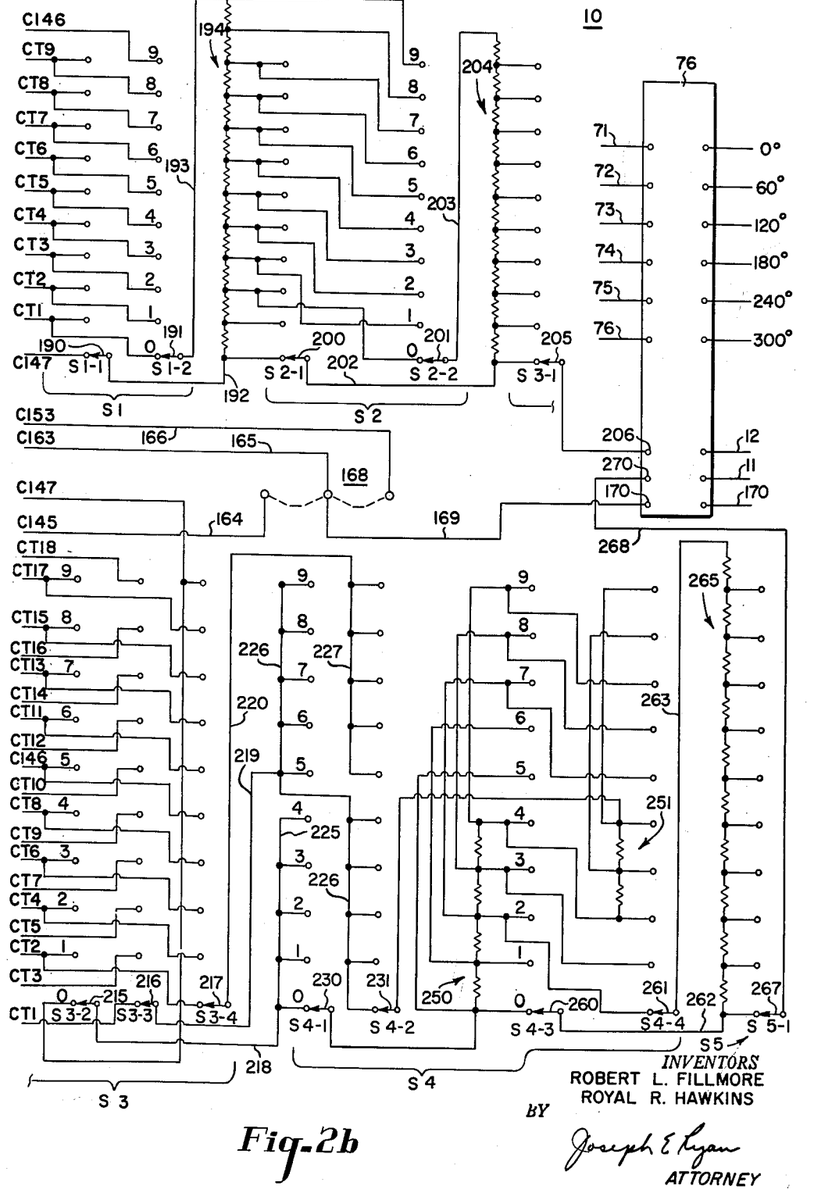

Referring to FIGURES 2a and 2b, there is shown basically the apparatus included in the block 10 in FIGURE 1 as the command voltage source. The command network is continued between FIGURES 2a and 2b, the two making up a composite drawing showing interconnections between the bridge network to be later defined in detail and a plurality of banks of switches designed to interconnect points on the bridge with an output. Considering FIGURE 2a the bridge network is shown at 60 as a hexagonal or six-sided bridge with corner points or connection points between the sides defined at 61–66 or the connection points between the sides as the input terminals to the network. The conductors extending from these points although not interconnected between FIGURES 2a and 2b are designed to lead to six terminals indicated at 71–76 in FIGURE 2b on terminal board 76 and to a six-phase source of power. Thus terminal 71 has reference power thereon with power at terminal 72 displaced 60 degrees therefrom, at terminal 73 displaced 120 degrees therefrom, at terminal 74 displaced 180 degrees therefrom, at terminal 75 displaced 240 degrees therefrom and at terminal 76 displaced 300 degrees therefrom. The sides of the bridge forming this network are each comprised of a plurality of resistor and potentiometer elements connected together with the wipers of the potentiometers so spaced and adjusted relative to the input voltage points as to provide, as will be later noted, equally spaced output points of varying phase relationship to the input signal. Thus between the input terminals 61, 62 or the side therebetween are resistors 81, 83, 85, 87 with potentiometers 82, 84, 86 positioned therebetween, all elements being series connected between the input points and the wipers of the potentiometers being identified as terminal points T1, T2 and T3. Similarly the side between input terminals 62, 63 comprises resistor potentiometer elements numbered from 91 through 97 are serially connected to one another with the potentiometers 92, 94 and 96 including wipers representing terminal points T4–T6. The side of the network between terminal points 63, 64 include resistors and potentiometers numbered from 101 through 107 with the potentiometers 102, 104 and 106 having wipers representing terminal points identified as T7–T9. The side of the network between terminals 64, 65 include resistor potentiometer elements serially connected numbered 111–117 with the potentiometers 112, 114 and 116 having wipers representing terminal points T10–T12. The side of the network between terminals 65, 66 similarly includes resistors and potentiometer elements 121–127 with the potentiometers 122, 124 and 126 having wipers representing terminal points T13–T15. The closing side of the bridge network between terminals 61, 66 includes the resistors and potentiometers in series numbered 131–137 with the potentiometers 132, 134 and 136 having wipers representing terminal points identified as T16–T18. In addition to the above, two reference points other than from potentiometer wipers are provided in the network as will be hereafter seen. Connected across the input terminals 61, 64 is a plurality of fixed resistors in a series circuit numbered 141, 142, 143 and 144 with a potentiometer 145 included between the resistors 142, 143. The common connection between resistors 141, 142 provides a terminal or output point 146 and a common connection between resistors 143, 144 provides a terminal point identified at 147 which as will be later defined leads to the switch banks. This latter resistor potentiometer combination are connected across the terminal points to provide a common or neutral output point and the resistors 141, 144 are included between the input points and the 61, 64 on the output terminals 146, 147 to provide reduced voltages at 146 and 147, these resistor element being sized as will be later described to provide balanced to neutral voltage division between terminals 64 and 61. The terminals 62, 65 have connected across the same a series connected resistor 151, 152 with a potentiometer 153 in series therewith and intermediately connected thereto. Similarly the input terminals 63, 66 have serially connected resistors 161 and 162 with the potentiometer 163 being spaced therebetween to provide a neutral output point for the input phase terminals. The potentiometers 145, 153 and 163 have their wipers connected through conductors 164, 165 and 166 to a common shunting point indicated at 168 with a common conductor 169 leading therefrom to a neutral output terminal 170 on the terminal block 76 indicated in FIGURE 2b. These resistor elements connected across the input diagonals to the bridge provide a common output terminal. The potentiometers 145, 153 and 163 are basically for balancing purposes and a common return could normally be provided merely through a resistor to a common connection from each of the six input terminal points. The interconnections between FIGURES 2a and 2b are identified by conductors corresponding to the potentiometers and ground conductors in FIGURE 2a prefaced by the letter "c."

The command bridge type network 60 described above is designed to provide output signals through the switches which vary in phase depending upon the positions of these switches as will be later defined. The phase difference between the signal outputs at terminal points on the bridge including the point 147 through T1–T9 point 146 and T10–T18 vary in phase from one another by a differential 18°, with the points 147 and 146 being 0 and 180° from reference respectively. Through the use of the potentiometers, adjustment may be made to provide this phase relationship. Associated with the bridge network are a plurality of banks of switches each having basically ten positions of operation which are referenced in the drawing FIGURE 2b as 0 through 9. For purposes of identification these switches are identified as S1, S2, S3, S4 and S5 with the individual banks for the switches being identified as an additional numeral after the switch number designation. Switch 1 includes banks S1–1 and S1–2 while switch 2 includes banks S2–1 and S2–2, switch 3 includes banks S3–1, S3–2, S3–3 and S3–4, and switch 4 includes banks S4–1, S4–2, S4–3 and S4–4. The final switch includes the single bank identified as S5–1. From this group of switches, switch S1, S2 and the first bank of switch S3 provide the switching arrangement for the coarse command, and similarly the switch S3 including the second, third and fourth banks, switch S4 and switch S5 provide the switching for the fine output command from the network. As will be later seen the input from the bridge terminals to the switches for the coarse command are connected first to the switch S1 across banks S1–1 and S1–2 from 0 to 180° points on the bridge network. To simplify numbering on the drawings the conductors are not numbered but switch bank S1–1 of switch 1 is connected from positions 0 through 9 to output point 147 on the bridge and T1 through T9. Bank S1–2 of switch 1 has the positions 0 through 8 connected respectively to positions 1 through 9 on bank S1–1 with a switch bank position 9 being connected to terminal point 146 on the bridge network. Since the wipers associated with the decks S1–1 and S1–2, identified as numerals 190, 191, will be in the same position for any position of operation, that is they will move together, an 18° phase differential will exist across the wipers 190, 191 which differential will vary in steps over the 0 to 180° span. The wipers 190, 191 are connected through conductors 192, 193 to a plurality of resistors identified generally at 194 which resistors are serially connected and as later identified connected across the banks S2–1 and S2–2 of switch 2. Of these 11 resistors, the first 9 are connected respectively across the position 0, 1, 1, 2, respectively on through position 9 of bank S2–1. The remaining 2 resistors are connected respectively across positions 7, 8 and 8, 9 of bank S2–2 of switch 2 with the switch positions 0 through 7 being connected respectively to positions 2 through 9 of bank S2–1 of switch 2. This will provide an arrangement in which each switch position will be one-tenth of the preceding switch positions on switch S1 and hence each change in switch position will represent 1.8° phase shift. Switch banks S2–1, S2–1 include the wipers identified by the numerals 200, 201 which are connected through conductors 202, 203 respectively to a plurality of 10 resistors in series relationship identified at 204 generally. Bank 1 of switch 3 is connected to these 10 resistors, the first 9 of which are connected between respective switch positions starting with 0 and extending through 9 with the tenth resistor being connected to the conductor 203. Switch S3–1 then provides increments of .18° in phase shift. A wiper 205 of bank 1, switch 3 extends to terminal board 76 at terminal 206 to define the coarse command output signal which will be impressed across the terminals 206, 170.

The switches S1, S2 and the first bank of S3 operate to set the first three digits of the five digit number in the linear positioning apparatus. For example the slide 36 driven by motor 32 is designed to move over a range of 0 to 10 inches with position increments of .0001 inch. The coarse command signal will thus provide the signals for the units, the tenths, and the hundredths of the inch input signal. As will be later noted, however, switch 3 includes three additional banks of switches which are adjusted simultaneously with and as a part of switch 3 such that the hundredth digit will also be defined in the fine command signal. For the purposes of coarse command, however, the signal output will vary in phase from the zero to 180° in 18 degree intervals such that for example in switch position 9 the input signal on the switch will be taken between terminals T9 and tap 146 representing the span 162° to 180°. Thus the phase signals on the terminals of switch 1 for position 9 will be 162° on bank 1 and 180° on bank 2 which signals will be impressed across the 11 resistors 194 on switch 2, bank 1. Switch 2 will divide this 18° into 10 equal increments such that a switch setting of 5 will set position for bank 1 will have 1.8° across the wipers 200, 201 to be impressed on the resistors 204. Further the signal on wiper 200 will be at 171° while the signal on wiper 201 will be 172.8°. The switch bank 1 of switch 3 will then take one-tenth of that signal to provide an ultimate output phase coarse command in accordance with the switch positions of the setting of the respective switches.

The fine signal command is determined or set by the switches contained in the banks of switches S3, S4 and S5, switch 3 having banks 2, 3 and 4 which are connected to the network 60 in a matter later to be defined. For the fine signal command, banks 2 and 3 of switch 3 are connected to the bridge network 60 in much the same manner as banks 1 and 2 if switch 1 were of the coarse command. The fine command signals, however, are taken from the entire network through 360° phase variation from reference. Thus bank 2 of switch 3 for positions 0 through 9 are connected respectively to terminal points or output points starting with 147, 0° reference and continuing in 36° intervals through wipers T2, T4, T6, T8, contact 146, T11, T13, T15 and T17. Bank 3 of switch 3 has its connections for the varying switch positions from zero through 9 connected respectively to wiper terminals T1, T3, T5, T7, T9, T10, T12, T14, T16, T18. As will be seen in FIGURE 2b, the bank 4 of switch 3 for the positions 1 through 9 are interconnected with bank 2 such that positions 0 through 8 are connected respectively with positions 1 through 9 while position 9 of bank 4 is connected with 0° reference found on terminal or position 0 of bank 2. Thus for the given switch setting of switch 3, there is an 18° phase differential between the switch position from bank 2 to bank 3 and similarly through bank 3 to bank 4. Thus the associated wipers for the banks 2, 3 and 4 numbered 215, 216, and 217 respectively for position 7 of the switch 3 will have respectively 252°, 270° and 288° signals impressed thereon. These wipers are connected through conductors 218, 219 and 220 to common lead connections for banks 1 and 2 of switch 4. Switch bank 1 of switch 4 for positions 0 through 4 has a common connection 225 which connects with conductor 218 such that positions 0 through 4 of bank 1 of switch 4 will have the same signal that it appears at wiper 215 for the varying switch positions of bank 2 of switch 3. Similarly positions 5 through 9 for switch bank 1 of switch 4 and positions 0 through 4 of switch bank 2 of switch 4 have a common connecting conductor 226 which is connected to the lead 219 leading to wiper 216 of bank 3 of switch 3. Further switch positions 5 through 9 of bank 2 for switch 4 has a common conductor 227 connected to the lead conductor 220 of wiper 217 for bank 4 of switch 3. Using the example indicated above position 7 of switch 3, it will then be recognized that switch positions 0 through 4 of bank 1 of switch 4 will have 252° phase signals impressed thereon while positions 5 through 9 of bank 1 will have 270° phase signals impressed thereon along with the same signal being applied to positions 0 through 4 of bank 2 for switch 4. Further the switch positions 5 through 9 of bank 2 for switch 4 will have 288° signals impressed thereon. Switch 4 also includes banks 3 and 4 which are supplied by or connected to the wipers of the banks 1 and 2 of switch 4 identified at 230, 231 respectively. Thus for bank 3 of switch 4, four resistors indicated generally at 250 are connected respectively between positions 0 and 4 with the wiper 230 being connected to position 0. Similarly the wiper positions 0 through 4 are connected respectively through positions 5 through 9 for bank 3. Wiper 231 of switch bank 2 switch 4 is connected to position 4 of bank 4 for switch 4 with a pair of resistors indicated at 251 being connected between switch positions 4, 3, and 3, 2. The circuitry for bank 4 is completed with positions 0, 1 and 2 on bank 4 being connected to positions 2, 3 and 4 of bank 3 with positions 5, 6, and 7 on bank 4 being connected to positions 7, 8 and 9 of bank 3 and with positions 3 and 4 of bank 4 being connected to positions 8 and 9 of bank 4. Wipers 260, 261 of banks 3 and 4 of switch 4 connect to bank 1 of switch 5 through conductors 262, 263 respectively to provide the output of switch 4. Bank 1 of switch 5 includes 10 series resistor elements indicated generally at 265 the first 9 of which are connected across the switch positions 0 through 9 of switch 5 with the extremity of the tenth resistor being connected to the conductor 263. Switch 5 includes wiper 267 which is connected through a conductor 268 to terminal 270 on the terminal board 76 to provide the fine command output from the switching units 3, 4, and 5, the fine command signal being impressed across the terminals 270 and the neutral terminal 170.

Thus for the fine command signals and assuming for example position 5 of switch 3 is indicated above for the coarse command signal, a position 5 for switch 4 and a position 5 for switch 5 it will be noted that across banks 2, 3, and 4 of switch 4, 180°, 198° and 216° will be impressed respectively. This will place on conductors 225, 227 for banks 1 and 2 of switch 4, 198° and 216° signals through movement of the wipers 216, 217. Thus the first two banks of switch 4 will have an 18° differential applied across the switch contacts for position 5 which will be the upper half of the 36° span for position 5. The similar positioning of the banks 1 through 4 of switch 4 on position 5 will impress across banks 3 and 4 of switch 4 through the wipers 230, 231 signals of 198° on switch positions 0 and 5 of bank 3. The wiper 231 positioned on position 5 of bank 2 will have 216° phase signal impressed thereon which will be connected through the resistors between positions 4 and 2 of bank 4, through the interconnecting conductor between position 2 on bank 4 and 4 on bank 3 and through the resistors 250 between positions 4 and 0 on bank 3, the interconnecting conductor between position 2 and 7 on bank 3 to the interconnecting conductor between positions 7 and 5 on banks 3 and 4 respectively. Thus with wipers 260, 261 positioned on position 5 for banks 3 and 4 of switch 4, the signal impressed thereon will be the differential between 198° and a phase shift introduced from 216° toward 198° by the six resistors 250, 251. This arrangement actually takes one-fifth of the 18° differential applied across the upper half of the banks on 1 and 2 of switch 4 to ultimately arrive at a one-tenth division of the signal impressed across the switch position of switch 3. This signal is thus applied across switch 5 having 10 equal resistors and a division by 10 is accomplished to provide an ultimate output signal to the conductor 268 to the output terminal 270 which is basically one-tenth added to the signals on the preceding switches for each division or unit change in switch position of switch 5.

Figures 3, 5:
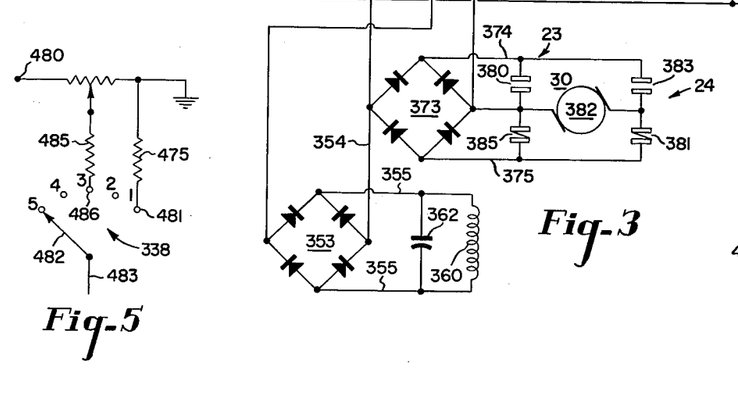
FIGURE 3 is a schematic circuit of the control circuit for operating the servo system.
FIGURES 4 and 5 are schematic drawings of a portion of the control circuit.

The control signals from the command voltage source which are phase variable and of substantially constant magnitude are adapted, as previously indicated, to be selectively connected to the servo loop or motor control circuit to be compared with a feedback signal and control the energization and direction of operation of the servo motor which positions the ultimate apparatus to be accurately and linearly positioned. The box marked "control circuits 60" is shown in FIGURE 3 with the phase detector shown schematically in connection with FIGURE 4. This control circuit is basically a scheduling device which selectively connects one or the other of the control circuits for the fine or coarse command signals and for the fine or coarse feedback signals in the phase detecting circuit and also controls the energization and direction of energization of the servo motor. As will be seen in the drawings, this particular linear positioning system is shown as applied to a direct current type motor but it will be evident that other types of servo motors may be utilized. Thus, as is shown in FIGURES 6a and 6b, the command signals, both coarse and fine, are of variable phase from a reference. Similarly, the feedback signals from the synchros are also of variable phase for both coarse and fine signals. These signals are selectively connected into the phase detecting network 20 wherein a 90 degree phase displacement therebetween represents a null condition. Phase detector 20 is conventional in form and is shown in block for simplicity. An error or phase difference from the null condition, either leading or lagging, will provide a directional error signal to the connected servo apparatus. Further the particular disclosure includes two modes of operation one of continuous energization and the other of a pecking operation as the balance condition is approached which may also be modified within the scope of this invention. Considering the control circuit in connection with FIGURE 3 the basic control is energized from an alternating source indicated at 300 and including a power transformer 301 having a primary winding 302 across the alternating current supply with an initiating switch 303 in series therewith. The transformer 301 includes a secondary winding 305 which provides a low voltage circuit for a plurality of controls to be later identified. Considering the secondary winding 305, it will be seen that this secondary winding feeds a control circuit through conductors 307, 308 to a pair of relay coils 309, 319 of directional relays 23, 24 (shown in block in FIGURE 1) which control direction of energization of the motor. In series with the respective coils are contacts indicated at 312, 315 which control the energization of these windings across the conductors 307, 308. These contacts are a part of a pair of discriminating relays (not shown) included in the amplifier identified in FIGURE 1 at 22. Thus depending upon the direction of energization of the amplifier, one or the other of the relays 23, 24 will be energized as a result of the energization and operation of the relays in amplifier 22. Also included in series with the conductor 307 is a momentary start button 320 which is utilized to connect a coil 321 of a control relay 322 across the conductors 307, 308 to energize the same. This relay contains a contact indicated at 330 which acts as both a holding contact for the relay coil and as a make contact for the armature and field winding of the motor as will be later defined. While operation of the start button 320 will initiate energization of the relay 322 or its coil 321 to operate the contact 330, it is necessary in the continuous operation of the motor to provide for operation of a plurality of switch decks through a Ledex or stepping type controller which sequentially operate through a plurality of positions switching from coarse to fine input command signals. Three such switch decks are shown in FIGURE 3 and are numbered respectively 335, 336 and 337 with the fourth being shown in FIGURE 5 numbered 338. The present disclosure, as will be later evidenced, shows a mode of operation in which the motor armature is directly connected to a source of power for the initial stage of adjustment and then pulsed power as the condition of balance is reached. For this reason the ratchet type switching mechanism or Ledex type device is utilized so that switching can be accomplished for both fine and coarse controls from the continuous mode of energization to the pulsed mode of energization. Thus the switch positions for the various decks from 1 through 5 represent these various steps in motor energization. Position 5 for all of the deck switches which are simultaneously operated is a rest position while positions 1 and 2 represent connections in which the coarse command signal controls the motor with position 1 being that of continuous energization and position 2 pulsed energization. Similarly positions 3 and 4 of the deck type switches provide for connection of the fine command to the motor with 3 being the position of one stage of pulsed energization of motor 30 and 4 position being a position of a second stage of pulsed energization of motor 30. The deck switches are adapted to operate from a five position to one upon initiation of power advancing from positions 1 through 4 to the rest position at 5 with an operation of the Ledex or oscillating type switching unit through a stepping control later to be defined. Thus the deck switch 336 includes an off condition for position 5 and on conditions for positions 1, 2, 3, and 4. Thus whenever the switch 336 is in positions 1, 2, 3, or 4 or therebetween a circuit will be made from the conductor 307 through the switch wiper 340, the sliding switch contact 341 and its associated connection 342 to a conductor 343 leading through a momentary type stop contact or switch 344 to the holding contact 330 to maintain the energization of the coil 321 or relay 322. This circuit will also set up an energization circuit for the field winding of the D.C. motor from the contact 330 through the conductor 350, conductor 351 to a full wave rectifier 353 and from the full wave rectifier through a conductor 354 to power conductor 308 connected to the secondary winding of the transformer with the output diagonals of the rectifier being connected through conductors 355 to a field winding 360 at the motor having a smoothing condenser 362 in parallel therewith across the conductors 355. Contact 330 also sets up the second circuit for the armature energization of the motor 30 from the contact 330 and conductor 350 through a time delaying contact indicated at 365 having an arcing condenser 366 in parallel therewith to a conductor 370 leading to a conductor 371 and a full wave rectifier 373 with the return from the rectifier being through the conductor 354 to conductor 308. The output terminals of the rectifier 373 are connected to conductors 374, 375 across which are connected normally open and normally closed contacts for the forward and reverse relays 23, 24. Thus for one direction of energization the relay 23 includes a normally open contact indicated at 380 to provide a circuit from conductor 374 through the motor armature 382 to a normally closed contact 381 of relay 24 to the conductor 375 and a rectifier 373. A reversed direction of energization of the motor 30 or reversal of current flow through the armature is accomplished by operation of a normally open contact 383 of relay 24 from the conductor 374 and through the armature 382 in a reverse direction to a normally closed contact 385 of relay 23 to the conductor 375 and rectifier 373. This reversing circuit is conventional being energized from a full wave rectifier to give direct current energization of the motor armature in varying directions depending upon the selected operation of the relays 23, 24. As was noted above these relays are operated in response to the contacts 312, 315 included in the amplifier 22 the details of which are not shown.

Figure 4:
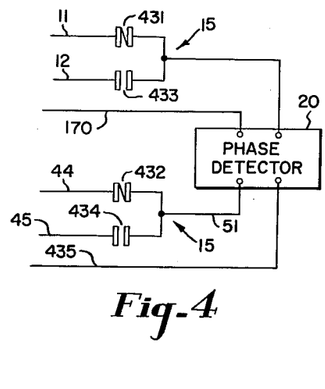

To initiate operation of the deck switches which are controlled by a Ledex or actuator coil which is shown at 400, a stepping control relay is provided, the coil being shown at 401. The stepping control is energized through the circuit from the deck switch or from the momentary start switch through the conductor 350, time delay contact 365 and condenser 366 to a conductor 405 and through normally closed contacts 406, 407 of the forward and reverse relays 23, 24 respectively to a normally open contact 410 of control relay 322 and through a manually adjusted switch 415 to the coil 401 connected to the conductor 308. Thus when the relay 322 pulls in with operation of the start switch, the contact 410 closes allowing the normally closed time delay switch to set up the energization circuit through the normally closed contacts 406, 407 and close contacts 410 of relay 322 to the coil 401. A parallel circuit controlling energization of stepping relay coil 401 is completed through the wiper or connection 342 of the deck switch 336 through a Ledex or ratchet interrupter circuit or switch 420, conductor 421 and a normally closed contact 422 of the control relay 322, and the automatic switch 415 for the stepping control relay to the conductor 308. With the closure of the start switch 320, the relay 322 is operated to close the contact 330 setting up a circuit through the contact 365 to the motor winding to be controllably energized in accordance with which the relays 23, 24 are energized. Initial energization of the stepping control is obtained through the circuit from the start contact 320 through the normally closed contact 365, normally closed contacts 406 and 407 to the closed contact 410 of relay 322 to energize relay 401 moving the ratchet type actuator or Ledex control from rest position 5 to start position 1. With this operation of the stepping switch, a circuit is made through the stepping control deck 335 from conductor 307 through a conductor 425 to conductor 426 which is connected to positions 1 and 2 of the stepping control and to a coil 430 of the coarse fine selection relay 15 which in turn is connected to conductor 308 to energize relay 15. This relay is actually a two position device and as indicated in FIGURE 4 has a pair of normally closed contacts 431, 432 and a pair of normally open contacts 433, 434 which selectively connect the coarse or fine command signals from the network 10 to the phase discriminator or detector 20 shown in block in FIGURES 1 and 4. The common conductors or bus 170 from the command is not switched and a similar or common conductor 435 from the synchro rotors (not shown in FIGURE 1) is directly connected to the phase detector unit. This is a conventional phase discriminator which operates in a null condition whenever the synchro signal is 90° displaced in phase from the command signal. The relay 430 therefore is energized in positions 1 and 2 to connect the coarse signals to the phase detector and the coarse feedback synchros to the phase detector and upon movement of the deck or ratchet type switch to positions 3 and 4 the relay will be deenergized at which point the normally closed contacts 431, 432 will connect the fine signal command and fine feedback synchro to the phase detector for a second condition of operation. The Ledex or ratchet type switch whose relay coil is indicated at 400 is energized directly from the line windings 300 through conductors 440, 441 connected in parallel or to the primary winding 302 of transformer 301 with the conductor 440 including a rectifier or diode 442 or provide a pulsed D.C. to the additional control circuit hereinafter identified. This portion of the control is directed basically to the energization of the Ledex and providing an energization for the time delay relay which provides the pulsing operation of the apparatus on fine and on the second position of coarse control. The energizing circuit for the Ledex or ratchet type actuator includes the conductor 440, diode 442, a conductor 443, an adjustable potentiometer 444, a contact 445 of the stepping control 401 and a coil 400 connected to the conductor 441 to complete the circuit. An arc suppression condenser 446 is included in parallel with the series connected contact 445 and coil 400. In addition the stepping control 401 includes an additional contact 450 connected to conductor 443 and through an adjustable potentiometer 451 to a coil 452 of the time delay relay whose contacts 365 maintains the energization of the armature of the motor 30. This circuit for the coil 452 is completed through the conductor 441. In parallel connection with the coil are a pair of condensers 455, 456 which provide its time delay operation. Also connected to the conductor 443 is a normally closed contact 465 of the time delay relay 452 having connected in series therewith a pair of parallel connected contacts 466, 467 of relays 23, 24 respectively and through a common connection 470 connected to positions 2, 3, and 4 of deck switch 337 with this circuit being completed through the wiper 471 to the time delay coil 452 and return conductor 441. In addition to the contacts 450 and 465 which control the energization of coil 452, a pair of normally closed contacts 460, 461, which like contacts 312, 315 are integral with the discriminating relays included in the A.C. amplifier (not shown in detail) operate as a shunt around condenser 455 to ultimately delay the energization of the stepping control relay 40 until the other control relays (23, 24) have energized their state of operation.

Although the details of the amplifier are not shown, it will be recognized that such a device is conventional and will include a pair of discriminating relays. The deck switch 338 operated by coil 400 provides for a change in bias on a portion of the amplifier to effect a change in amplifier gain (not shown) for different switch positions. Thus as indicated in FIGURE 5 a first biasing resistor 475 is connected from a voltage supply 480 to the amplifier or to the first terminal of the switch 481, of the connection of the wiper of the switch 482 being connected to a portion of the amplifier such as the grid through conductor 483 for biasing purposes. A similar resistor of different values indicated at 485 is connected to position 3 of the switch 436 such that when switches in position 3 are different a biasing level will be presented to the amplifier to change the mode of operation of the same. The remaining positions of the amplifier do not provide this additional bias on the amplifier and consequently provide the different pecking operations causing the amplifier to reach a deenergized position with respect to the relays for the purpose of providing a pecking operation which is conventional.

Considering the control apparatus per se it will be seen that the operation of the start button 320 will pick up relay 322 to set up the energizing circuit for the time delay contact 365 for the motor armature and will also energize the field winding 360. Further, since in this initial mode of operation the system will have been balanced and the deck switches will be on the home position 5 for the deck switches the relay coils 23, 24 will be in the deenergized condition. Therefore the contacts 406, 407 will be normally closed and the contact 410 will close with the energization of coil 322 energizing coil 401 in the circuit previously mentioned to provide a stepping operation. The effect of the energization of coil 401 will be to energize or close the contacts 445 and 450 energizing the Ledex coil or ratchet coil 400 to advance all of the deck switches 336, 335, 337 and 338 to position 1. A variable phase signal upon the command output terminals of the bridge network 10 will thus be connected through the energization of the relay 430 and as indicated in FIGURE 4 will close the contacts 433, 434 to provide a differential signal to the phase detector 20 energizing the chopper 21 and the amplifier 22 to close one or the other of the relays 23, 24 depending upon the direction of phase unbalance from a reference. Thus one or the other of the relays 23, 24 will be energized and the respective contacts 380, 383 closed while normally closed contacts 385, 381 opened to provide a directional current flow through the motor armature 382 causing rotation of the motor 30, gear box 32 and slide 36. With energization of the relays 23, 24 one or the other of the normally closed contacts 406, 407 will open deenergizing the relay 401 and causing the Ledex 400 through the contact 445 to be deenergized. Thus the Ledex or ratchet relay will advance one position and stop. It should be noted also that the contact 450 of stepping control 401 will have been momentarily energized but the time delay relay 452 because of the condensers 455, 456 will not be energized since the relay 401 will open to break this energization circuit before the relay may be operated. Thus contact 365 will remain closed in its normal position maintaining the energization circuit for the motor. The contact 365 is utilized for the pulsing operation of the motor. At the same time the contact 465 and one or the other of the contacts 23, 24 will have been closed but since the stepping switch 337 is on position 1 no circuit will be made to the coil 352. Actuation of the stepping control to the second step or sequence of operation will be accomplished by a condition of a null balance in the phase detector causing a drop out of one or the other of the relays 23, 24 which has been energized closing the contacts 406 or 407 to re-establish energization for the coil 401 and causing a second pulse of operation to the relay coil 400 through the contact 445. The latter will advance the deck switches to position 2 wherein the circuit will now be made to the coil 452 assuming operation of one or the other of the relays 23, 24. As indicated in FIGURE 5 a change in bias will have taken place on the armature and hence this output of the detector 20 which previously was not sufficient to energize the amplifier relays will now cause the pulsing mode of operation to take place this being accomplished through the circuit from the diode 442, contact 465 one or the other of the contacts 466 or 467, stepping switch 337 to the time delay coil 452. The latter will present a given delay in energization but upon operation will open the contact 365 breaking the energization circuit to the motor armature 382 to provide the pulsed mode of operation. This pulsing mode of operation will continue by virtue of the normally closed time delay contact 365 being included in this energizing circuit for coil 452 such that the time delay coil 452 will receive pulsed energization to operate the contact 365 until both of the contacts 23, 24 are open breaking this energization circuit.

Thus the motor armature will receive pulsed power on position 2 of the deck switches until a null condition for the bias level on amplifier 22 prevails. With this condition of balance, the relays 406, 407 will be returned to its normally closed position and the contact 410 having remained closed will reenergize coil 401 to advance the Ledex through energization of the coil 400 by virtue of the closing of contact 445. When position 3 is reached the relay coil 430 or the coarse and fine command selecting relay will be opened or deenergized shifting the operation of contacts 433, 434 to its open position and returning the contacts 431, 432 to a normally closed position connecting the fine signal command and the feedback signal from the fine synchro to the detector 20. Continued phase displacement or signal will be fed to the amplifier establishing a pulsing mode of operation with a new bias condition on the amplifier 22 as dictated by the operation of switch 338 to position 3. In this condition of operation, the deck switch 337 will provide the oscillating operation of time delay coil 452 through the circuit including contacts 465 and one or the other of the contacts 466, 467 to pulse the motor until an initial balance condition is reached. Whenever a balance condition is reached, the contacts 460, 461 of the relays 23, 24 will provide a shunt on the coil 452 eliminating the pulsing operation. At the same time, the contacts 406, 407 will return to a normally closed position to reenergize coil 401 and provide the final step of operation through energization of the coil 400. A change in bias on the amplifier due to operation or advance of the switch 338 to position 4 will provide the second condition of fine operation of the motor with the pulsing mode of operation through the time delay relay 452 being energized through the switch 336 or position 4. When final balance is reached, the null condition of the detector will open or deenergize both of the relays 23, 24 connecting the coil 401 to operate the stepping control 400 to the homing position 5.

Included in the circuit above is the parallel energization tap through the stepping switch interrupter 420 and the normally closed contacts 422 of relay 322 to the stepping control relay coil 401. This is provided in the event that the device or apparatus is in one of the positions 1, 2, 3 or 4 and a stop switch 344 is open dropping out the coil 322 to permit operation of the decks control back to the home position 5. The contact 420 will close with the operation or energization of the coil 400 until the deck switches have changed to the next position at which point it will close again causing the oscillation or advance on the stepping switch in a conventional manner.

Thus as is indicated in FIGURE 1 the control circuits generally indicated in block at 60 initiate the operation of the relays or switches generally indicated at 15 which are in effect the fine and coarse selection device to connect input and feedback signals through the phase detector and operate the motor in a plurality of stages in sequence of operation to position the slide in accordance with the command signal. The actual command signal is variable in phase with a coarse command being phase variable over 0 to 180° while the fine command signal is phase variable over 360° from the reference in accordance with the operation of the switches S1, S2, S3, S4, and S5. It will be recognized that while a direct current motor is utilized herein any proportional type motor may be utilized eliminating the pecking or pulsing operation and energizing the motor directly from the phase detector to provide proportional control in accordance with the phase differential appearing between command and feedback signals until the balance condition is reached.

In considering this invention it should be remembered that the present disclosure is intended to be illustrative only and that we wish to be limited only by the appended claims.

We claim as our invention:

1. In a linear positioning system, in combination, a command voltage divider including a six-sided bridge network each side comprised of a plurality of potentiometer and resistor elements, input circuit means connected to the six corners of said bridge network, a six phase source of power each phase respectively being connected to said input circuit means to energize said network at the corners with an alternating signal supply spaced in phase from a reference by approximately 60 electrical degrees, potentiometer circuit means connecting diametrically opposite corner points of said bridge network and including additional circuit means connecting said potentiometer wipers of said circuits in a common connection to form a neutral conductor, a plurality of ganged switches connected in part to equally spaced potentiometer wipers of said potentiometers in said legs of said bridge network over one-half of said network to provide phase signal outputs displaced in phase 18 degrees, said switches being adjusted to provide phase signal outputs according to switching positions of said switches to provide a coarse signal command variable in phase from 0 to 180 degrees between one of said switches and said neutral conductor, additional switch means including the plurality of ganged switches connected respectively to equally spaced potentiometer wipers of all six sides of said bridge network said switches providing a signal output variable in phase from 0 to 360 degrees in accordance with varying switch settings to provide a fine signal command, amplifier motor means adapted to be energized from said command voltage divider, circuit means including a relay means adapted to connect either coarse or fine signal commands to said amplifier means, a drive screw driven by said motor and mounting a slide adapted to be linearly positioned in accordance with the variable phase command voltage signal outputs of coarse and fine commands, feedback synchros including a fine and a coarse synchro geared to said motor and said slide to produce variable phase feedback signals in accordance with rotation of said motor, circuit means including a switching means selectively connecting one or the other of said fine or coarse synchros to said amplifier means, phase detection means included in the circuit between said command voltage divider and rotor winding of synchros and operative to provide a null output to said amplifier when said phase signals from said command voltage source and said synchros are 90 degrees displaced in phase, and further control circuit means for initiating the operation of said motor and for operating said relay and switching means to select said fine or coarse command signals and the synchro signals to be fed to said amplifier.

2. In a linear positioning system, in combination, a command voltage divider including a plural-sided bridge network each side comprised of a plurality of potentiometer and resistor elements, input circuit means connected to the connections of the sides of said bridge network, a poly-phase source of power each phase respectively being connected to said connections to energize said network at said connections with an alternating signal supply equally spaced in phase from a reference, potentiometer circuit means connecting diametrically opposite connections of said bridge network and including additional circuit means connecting said potentiometer wipers of said circuits in a common connection to form a neutral conductor for the output of said network, a plurality of ganged switches connected in part to equally spaced poteniometer wipers of said potentiometers in said legs of said bridge network over one-half of said network to provide phase signal outputs equally displaced in phase, said switches being adjusted to provide phase signal outputs according to switching position of said ganged switches to provide a coarse signal command variable in phase from 0 to 180 degrees between one of said switches and said neutral conductor, additional switch means including the plurality of ganged switches connected respectively to potentiometer wipers of the sides of said bridge network and being equally spaced in phase, said switches providing a signal output variable in phase from 0 to 360 degrees in accordance with varying switch settings to provide a fine signal command between one of said switches and said neutral conductor, amplifier motor means adapted to be energized from said coarse and fine signal commands of said command voltage divider, circuit means including a relay means adapted to connect either coarse or fine signal commands to said amplifier means, a drive screw driven by said motor and mounting a slide adapted to move linearly in accordance with the command voltage signal of coarse and fine signal commands, feedback synchros including a fine and a coarse synchro geared to said motor and said slide and operated to produce variable phase feedback signals in accordance with rotation of said motor, circuit means including a switching means selectively connecting one or the other of said fine or coarse synchros to said amplifier means, phase detection means included in the circuit between said command divider and said synchros and operative to provide a null output to said amplifier when said phase signals from said command voltage divider and said synchros are 90 degrees displaced in phase, and control circuit means for initiating the operation of said motor and for operating said relay and switching means to select said fine or coarse command signals and the synchro signals to be fed to said amplifier.

3. In a linear positioning system in combination, a command voltage divider including a six-sided bridge network each side comprised of a plurality of potentiometer and resistor elements, input circuit means connected to the six corners of said bridge network, a six phase source of power each phase respectively being connected to said input circuit means to energize said network at the corners with an alternating signal supply spaced in phase from a reference by 60 degrees, an additional circuit including resistor means connecting the corner of said bridge network to form a common output conductor for said network, a plurality of switches connected in part to equally spaced potentiometer wipers of said potentiometers in said legs of said bridge network over one-half of said network and to a second output conductor to provide phase signal outputs displaced in phase 18 degrees at said conductor, said switches being adjusted to provide phase signal outputs according to switching positions of said switches to provide a coarse signal command variable in phase from 0 to 180 degrees, additional switch means including the plurality of switches connected respectively to potentiometer wipers of all six sides of said bridge network and to a third output conductor the connections being equally spaced on the sides of the bridge network, said switches providing a signal output variable in phase from 0 to 360 degrees in accordance with varying switch positions to provide a fine signal command at said third output conductor, amplifier motor means adapted to be energized from said command voltage divider, circuit means including a relay means adapted to connect either second or third output conductors to said amplifier means, said motor means adapted to be linearly positioned in accordance with the outputs of network, feedback synchros including a fine and a coarse synchro geared to said motor to produce variable phase feedback signals in accordance with rotation of said motor, circuit means including a switching means selectively connecting one or the other of said fine or coarse synchros to said amplifier means, phase detection means included in the circuit between said network and said synchros and operative to provide a differential output to said amplifier, and control circuit means for initiating the operation of said motor and for operating said relay and switching means to select said fine or coarse signals, and said synchro signals to be fed to said amplifier.

4. In a linear positioning system, in combination, a command voltage divider including a poly-sided bridge network each side comprised of a plurality of potentiometer and resistor elements, input circuit means connected to the connections of the sides of said bridge network, a poly-phase source of power each phase respectively being connected to said connections to energize said network with an alternating signal supplied equally spaced in phase from a reference, potentiometer circuit means connecting said connections through resistors in a common connection to form a common output conductor for said network, a plurality of switches connected to equally spaced potentiometer wipers of said potentiometers in said legs of said bridge network over one-half of said network and to a second output conductor to provide varying phase signal outputs, said switches being adapted to be adjusted to provide phase signal outputs according to switching position of said switches to provide a coarse signal command between said first and second conductors variable in phase from 0 to 180 degrees, additional switch means including the plurality of switches connected respectively to equally spaced potentiometer wipers of all six sides of said bridge network and to a third output conductor said switches providing a signal output variable in phase from 0 to 360 degrees in accordance with varying switch positions to provide a fine signal command between said first and third conductor, amplifier motor means adapted to be energized from said network, circuit means including a relay means adapted to selectively connect said conductors to either coarse or fine command signals to said amplifier means, said motor means being linearly positioned in accordance with the said coarse and fine command signals, feedback synchros including a fine and a coarse synchro geared to said motor and operated to produce variable phase feedback signals with rotation of said motor, circuit means including a switching means selectively connecting one or the other of said fine or coarse synchros to said amplifier means, phase detection differential means included in the circuit between said network and said synchros to energize said amplifier, and control circuit means for initiating the operation of said motor and for operating said relays and said switching means to select said fine or coarse signals from said bridge network and said synchros to be fed to said differential means.

5. In a linear positioning system, in combination, a command voltage divider including a six-sided bridge network each side comprised of a plurality of potentiometer and resistor elements, input circuit means connected to the six corners of said bridge network, a six phase source of power each phase respectively being connected to said input circuit means to energize said network at the corners with an alternating signal supply spaced in phase from a reference by approximately 60 electrical degrees, potentiometer circuit means connecting diametrically opposite corner points of said bridge network and including additional circuit means connecting said potentiometer wipers of said circuits in a common connection to form a neutral conductor, a plurality of ganged switches connected in part to equally spaced potentiometer wipers of said potentiometers in said legs of said bridge network over one-half of said network to provide phase signal outputs displaced in phase 18 degrees, said switches being adjusted to provide phase signal outputs according to switching positions of said switches to provide a coarse signal command variable in phase from 0 to 180 degrees between one of said switches and said neutral conductor, additional switch means including the plurality of ganged switches connected respectively to equally spaced potentiometer wipers of all six sides of said bridge network, said switches providing a signal output variable in phase from 0 to 360 degrees in accordance with varying switch settings to provide a fine signal command, amplifier motor means adapted to be energized from said command voltage divider, circuit means including a relay means adapted to connect either coarse or fine signal command to said amplifier means, a drive screw driven by said motor and mounting a slide adapted to be linearly positioned in accordance with the command voltage signal outputs of coarse and fine commands, fine and coarse feedback synchros energized with poly-phase excitation to provide poly-phase positional feedback signals for balancing the fine and coarse signal command signals, said synchros being driven by said motor and said slide to operate in accordance with rotation of said motor, circuit means including a switching means selectively connecting one or the other of said fine or coarse synchros to said amplifier means, phase detection means included in the circuit between said command voltage divider and the rotor winding of said synchros and operative to provide a null output to said amplifier when said phase signals from said command voltage source and said synchros are 90 degrees displaced in phase, and control circuit means for initiating the operation of said motor and for operating said relay and switching means to select said fine or coarse signals and said synchro signals to be fed to said amplifier.

6. In a linear positioning system, in combination, a command voltage divider including a six-sided bridge network each side comprised of a plurality of potentiometer and resistor elements, input circuit means connected to the six corners of said bridge network, a six phase source of power each phase respectively being connected to said input circuit means to energize said network at the corners with an alternating signal supply spaced in phase from a reference by approximately 60 electrical degrees, potentiometer circuit means connecting diametrically opposite corner points of said bridge network and including additional circuit means connecting said potentiometer wipers of said circuits in a common connection to form a neutral conductor, a plurality of ganged switches connected in part to equally spaced potentiometer wipers of said potentiometers in said legs of said bridge network over one-half of said network to provide phase signal outputs displaced in phase 18 degrees, said switches being adjusted to provide phase signal outputs according to switching positions of said switches to provide a coarse signal command variable in phase from 0 to 180 degrees between one of said switches and said neutral conductor, additional switch means including the plurality of ganged switches connected respectively to equally spaced potentiometer wipers of all six sides of said bridge network said switches providing a signal output variable in phase from 0 to 360 degrees in accordance with varying switch settings to provide a fine signal command, amplifier motor means adapted to be energized from said command voltage divider, circuit means including a relay means adapted to connect either coarse or fine signal command to said amplifier means, a drive screw driven by said motor and mounting a slide adapted to be linearly positioned in accordance with the command voltage signal outputs of coarse and fine commands, fine and coarse feedback synchros energized with three-phase excitation to provide variable phase positional feedback signals for balancing the fine and coarse signal command signals, means connecting said synchros to said motor to operate in accordance with rotation of said motor, circuit means including a switching means selectively connecting one or the other of said fine or coarse synchros to said amplifier means, phase detection means included in the circuit between said command voltage divider and rotor windings of said synchros and operative to provide a null output to said amplifier when said phase signals from said command voltage divider and said synchros are 90 degrees displaced in phase, and control circuit means for initiating the operation of said motor and for operating said relay and switching means to select said fine or coarse command signals and synchro signals to be fed to said amplifier.

7. A variable phase command signal apparatus comprising a poly-sided bridge network each side comprised of a plurality of potentiometer and resistor elements, input circuit means connected to the connections of the sides of said bridge network, a poly-phase source of power each phase respectively being connected to said connections to energize said network with an alternating signal supplied equally spaced in phase from a reference, potentiometer circuit means connecting said connections through resistors in a common connection to form a first output conductor for said network, a plurality of switches connected to equally spaced potentiometer wipers of said potentiometers in said legs of said bridge network over one-half of said network and to a second output conductor to provide varying phase signal outputs, said switches being adapted to be adjusted to provide phase signal outputs according to switching position of said switches to provide a coarse signal command between said first and second conductors variable in phase from 0 to 180 degrees, additional switch means including the plurality of switches connected respectively to potentiometer wipers of all sides of said bridge network and to a third output conductor being equally spaced in phase, and said switches providing a signal output variable in phase from 0 to 360 degrees in accordance with varying switch positions to provide a fine signal command.

8. A variable phase command signal apparatus, comprising, a six-sided bridge network each side comprised of a plurality of potentiometer and resistor elements, input circuit means connected to the six corners of said bridge network, a six phase source of power each phase respectively being connected to said input circuit means to energize said network at the corners with an alternating signal supply spaced in phase from a reference by 60 degrees, additional circuit including resistor means connecting the corner of said bridge network in common to form a common output conductor for said network, a plurality of switches connected in part to equally spaced potentiometer wipers of said potentiometers in said legs of said bridge network over one-half of said network and to a second output conductor to provide phase signal outputs displaced in phase 18 degrees at said conductor, said switches being adjusted to provide phase signal outputs according to switching position of said switches to provide a coarse signal command variable in phase from 0 to 180 degrees, additional switch means including the plurality of switches connected respectively to potentiometer wipers of all six sides of said bridge network and to a third output conductor being equally spaced in phase 18 degrees, and said switches providing a signal output variable in phase from 0 to 360 degrees in accordance with varying switch positions to provide a fine signal command at said conductor.

9. In combination, a variable phase command apparatus including a poly-sided bridge network each side comprised of a plurality of potentiometer and resistor elements, input circuit means connected to the connections of the sides of said bridge network, a poly-phase source of power each phase respectively being connected to said connections to energize said network with an alternating signal supplied equally spaced in phase from a reference, potentiometer circuit means connecting said connections through resistors in a common connection to form a first output conductor for said network, a plurality of switches connected to equally spaced potentiometer wipers of said potentiometers in said legs of said bridge network over one-half of said network and to a second output conductor to provide varying phase signal outputs, said switches being adapted to be adjusted to provide phase signal outputs according to switching position of said switches to provide a coarse signal command between said first and second conductors variable in phase from 0 to 180 degrees, additional switch means including the plurality of switches connected respectively to equally spaced potentiometer wipers of all sides of said bridge network and to a third output conductor said switches providing a signal output variable in phase from 0 to 360 degrees in accordance with varying switch positions to provide a fine signal command, motor means adapted to be controllably energized from said variable phase command apparatus, connection means connecting said motor means to said command apparatus, a plurality of signal producing devices connected to and driven by said motor means, said signal producing devices being energized from a poly-phase exciting source and adapted to produce variable phase feedback signals in proportion to the position of said motor means, and further means connecting said signal producing devices to said connection means to balance the signals from said command apparatus.

References Cited in the file of this patent
UNITED STATES PATENTS

| | | |
|---|---|---|
| 2,455,364 | Hays | Dec. 7, 1948 |
| 2,537,770 | Livingston | Jan. 9, 1951 |
| 2,764,720 | Kelling | Sept. 25, 1956 |
| 2,848,670 | Kelling et al. | Aug. 19, 1958 |
| 2,896,198 | Bennett | June 21, 1959 |
| 2,922,991 | Frank | Jan. 26, 1960 |
| 2,943,248 | Ritchey | June 28, 1960 |
| 2,969,534 | Fisher | Jan. 24, 1961 |
| 3,004,251 | Rapacz | Oct. 10, 1961 |